3,133,793
Patented May 19, 1964

---

3,133,793
METHOD OF PREPARING DEUTERIUM-ENRICHED HYDROGEN
Bernard Lefrancois, Henri Sack, and Christian Vaniscotte, Douai, and Gregoire Dirian, Paris, France, assignors to Etablissement Public dit: Houilleres du Bassin du Nord et du Pas-de-Calais and Commissariat a l'Energie Atomique, of Douai and Paris, France, respectively, both corporations of France
No Drawing. Original application Dec. 10, 1959, Ser. No. 858,577. Divided and this application July 11, 1962, Ser. No. 209,270
Claims priority, application France Dec. 13, 1958
6 Claims. (Cl. 23—211)

This invention relates to improvements in the catalysis of isotope exchange reactions.

In isotope exchange reactions, for example, in the process for preparing deuterium-enriched hydrogen by isotopic exchange between liquid ammonia and hydrogen, it has been proposed to increase the reaction rate by adding sodium or potassium amide catalysts. However, the thus increased reaction rates are still considerably less than might be desired, and, moreover, sodium amide is, at best, only very slightly soluble in liquid ammonia. Further, the previously proposed catalyst compositions are highly inflammable and even explosive, and their handling involves considerable hazard.

Accordingly, it is an object of the present invention to provide improved catalysis of isotope exchange reactions of the above described type so as to achieve reaction rates that are far greater than those previously attained.

The present invention is based upon the surprising discovery that, the use of caesium amide or rubidium amide, or caesium and rubidium amides dissolved in liquid ammonia as catalysts in isotope exchange reactions of the described character eliminates all of the difficulties encountered with previously employed catalysts, and particularly results in very substantially increased reaction rates and are safe to handle.

The use as catalysts in isotope exchange reactions of caesium or rubidium amides, or caesium and rubidium amides dissolved in liquid ammonia has other advantages over the previously proposed use of lithium, sodium and potassium amides as catalysts in such reactions, and this is particularly surprising in view of the chemical similarity of the mentioned compounds.

An outstanding additional advantage is the high solubility of caesium and rubidium amides in liquid ammonia, whereby concentrated homogeneous reaction media can easily be prepared. Further, caesium and rubidium amides are catalytically effective at lower operating temperatures than the previously employed catalysts, and they are readily recoverable by a simple ion exchange process and thus permit continuous cyclic operation. Thus, the use, as catalysts, of caesium or rubidium amides dissolved in liquid ammonia makes it possible to conduct the isotope exchange reactions at temperatures in the range of from approximately $-70°$ C. to $+70°$ C. under the natural pressure of the liquid ammonia at the selected reaction temperature and with a concentration within the range of from approximately 0.05% to 10%, by weight, preferably, from approximately 0.1% to 3%, by weight, of the liquid ammonia.

As previously indicated, caesium or rubidium amides dissolved in liquid ammonia are particularly suitable for the catalysis of isotope exchange reactions between hydrogen and ammonia, for example, as in the deuterium enrichment of hydrogen for the preparation of heavy water. In this respect, caesium and rubidium amides inherently possess a greater capacity than alkali amides to promote the bonding of deuterium, rather than the hydrogen, to the ammonia in such processes, and, in view of the greater solubility of caesium and rubidium amides in the liquid ammonia, such catalysts yield reaction media having substantially higher activity. This makes it possible to employ relatively simpler and smaller reaction apparatus, while obtaining higher conversion yield ratios. At the same time, the reactions can be run at relatively lower temperatures, at which temperatures the conversion ratios are correspondingly higher.

The invention will now be further described with reference to the following specific examples thereof which particularly relate to the use of caesium and rubidium amides as catalysts in the isotope exchange reaction between ammonia and hydrogen in a process for preparing deuterium-enriched hydrogen:

*Example 1*

The apparatus used in this example for contacting the gas and liquid comprises a cylindrical reactor 40 mm. in diameter and provided at its base with a porous plate having pores of 50 micron average diameter. The hydrogen is delivered under a pressure of 375 kg./sq. cm. to the space under the porous plate and is distributed through the pores in the plate as fine bubbles throughout the cross-sectional area of the column of liquid ammonia overlying the plate. The concentration of rubidium amide catalyst in the liquid ammonia was 0.18 mole per liter. The temperature was $-50°$ C. The rate of hydrogen flow was 4.5 cu. m. per hr. under the standard conditions of $0°$ C. and 760 mm. Hg.

Since the deuterium concentration in the incoming hydrogen and the effluent hydrogen and that in the liquid ammonia were at any time known by isotopic analysis, the Murphree yield or efficiency value E, as defined by the formula $$E = \frac{C - C\infty}{C_0 - C\infty}$$

is easily computed. In the above formula C is the isotope concentration in the effluent hydrogen, $C_0$ the isotope concentration in the incoming hydrogen, and $C\infty$ the isotope concentration that would be had in the hydrogen if the balanced Reaction 1 indicated below could proceed to completion. The Reaction 1 can in turn be broken down into the two Reactions 2 and 3 of the first order, that is, the concentration C of each of the constituents of any of the systems approaches a limiting concentration $C\infty$ in accordance with an inverse exponential law of the form $$|C\infty - C| = e^{-kt}$$

where $t$ is time and $k$ the reaction rate constant. The over-all Reaction 1 is therefore also of order 1:

(1)
$NH_2D$ (liquid) $+ H_2$ (gas) $\rightleftharpoons$ HD (gas) $+ NH_3$ (liquid)
(2)
(Dissolved) $HD + H_2$ (gas) $\rightleftharpoons$ HD (gas) $+$ (dissolved) $H_2$
(3)
$NH_2D$ (liquid) $+$ (dissolved) $H_2 \rightleftharpoons$ (dissolved)
$HD + NH_3$ (liquid)

The Murphree efficiency value found when using rubidium amide $NH_2Rb$ dissolved in liquid ammonia as the catalyst was 24.0.

In order to compare the above Murphree efficiency value when using rubidium amide as the catalyst, with the results obtained when using the previously proposed potassium amide as the catalyst, the above process was repeated under exactly the same conditions, but using potassium amide as the catalyst, and a Murphree efficiency value of 4.5 was obtained.

Example 2

The process of Example 1 was again repeated under the identical conditions recited therein, but employing caesium amide $NH_2Cs$ as the catalyst, and a Murphree efficiency value of 22.0 was obtained.

The above examples apparently show that the rubidium and caesium amides are approximately five times more potent, as catalysts, than potassium amide in the catalysis of the isotope exchange reaction between ammonia and hydrogen. However, as will be understood from the above explanations, under the operating conditions employed, the over-all reaction rate is actually intermediate between the rates of Reactions 2 and 3, since diffusion phenomena which are identical for all three tests, that is, for the processes employing rubidium amide and caesium amide in accordance with the present invention, and for the process employing potassium amide, as previously suggested, act to limit the over-all reaction rate. Consequently, the ratio between the catalytic activity of the rubidium and caesium amides and the catalytic activity of potassium amide is certainly higher than the experimentally indicated value of 5.

Example 3

Tests similar to those in Example 1 were run, but using the following operating conditions: Pressure 500 kg./sq. cm. Temperature —65° C. Amide concentration 0.68 mol/liter. Hydrogen flow rate 4.5 cu. m./hr.

The results were:

|  | Catalyst used | Murphree Efficiency Value, E percent |
|---|---|---|
| Potassium Amide | $NH_2K$ | 1.8 |
| Rubidium Amide | $NH_2Rb$ | 17 |
| Caesium Amide | $NH_2Cs$ | 18 |

This example shows that by operating at a somewhat lower temperature, but increased pressure, the catalytic activity of potassium amide is greatly depressed whereas that of caesium amide and rubidium amide is practically unchanged despite the much lower concentration of amide. In this case therefore the activity of rubidium amide and caesium amide is more than ten times greater than that of potassium amide.

Very substantial increases in catalytic activity are also obtained when using rubidium and caesium amides in admixture with one another, or with potassium amide, as specifically indicated in the following example.

Example 4

The process of Example 1 was repeated under the identical conditions, but employing an equi-molecular mixture of rubidium amide and potassium amide, each equal to 0.09 molecule per liter of liquid ammonia, that is, a total concentration of the rubidium and potassium amides of 0.18 gram molecule per liter of liquid ammonia. The use of the mixture of rubidium and potassium amides yielded a Murphree efficiency value of 18.0.

Although the above examples refer specifically to the preparation of deuterium-enriched hydrogen by isotope exchange between hydrogen and ammonia, as in the preparation of heavy water, the considerable increases in catalytic activity of rubidium and caesium amides, when employed singly or in admixture with one another or with potassium amide, as there indicated make it apparent that such catalysts make it possible to obtain very great increases in yield in any enriching process involving isotopic exchange between liquid ammonia and hydrogen.

What is claimed is:

1. A method of preparing deuterium-enriched hydrogen, comprising reacting hydrogen and liquid ammonia in which at least a part of the hydrogen is deuterium at a temperature in the range between approximately —70° C. and +70° C. and in the presence of a catalyst composition dissolved in the liquid ammonia and comprising an amide of at least one metal selected from the group consisting of caesium and rubidium, said amide being present in the catalyst composition in an amount between 0.05% and 10%, by weight, of said liquid ammonia.

2. A method of preparing deuterium-enriched hydrogen, comprising reacting hydrogen and liquid ammonia containing combined deuterium at a temperature in the range between approximately —70° C. and +70° C. and in the presence of a catalyst composition dissolved in the liquid ammonia and comprising an amide of at least one metal selected from the group consisting of caesium and rubidium, said amide being present in the catalyst composition in an amount between 0.1% and 3%, by weight, of said liquid ammonia.

3. A method of preparing deuterium-enriched hydrogen, comprising reacting hydrogen and liquid ammonia containing combined deuterium at a temperature in the range between approximately —70° C. and +70° C. and in the presence of rubidium amide in an amount between 0.05% and 10%, by weight, of said liquid ammonia.

4. A method of preparing deuterium-enriched hydrogen, comprising reacting hydrogen and liquid ammonia containing combined deuterium at a temperature in the range between approximately —70° C. and +70° C. and in the presence of caesium amide in an amount between 0.05% and 10%, by weight, of said liquid ammonia.

5. A method of preparing deuterium-enriched hydrogen, comprising reacting hydrogen and liquid ammonia containing combined deuterium at a temperature in the range between approximately —70° C. and +70° C. and in the presence of a catalyst composition dissolved in the liquid ammonia and comprising potassium amide and the amide of at least one metal selected from the group consisting of caesium and rubidium, the last mentioned amide being present in said catalyst composition in an amount between 0.05% and 10%, by weight, of said liquid ammonia.

6. In a process involving the exchange of deuterium between hydrogen and ammonia, the step of dissolving in said ammonia, in the liquid state, a catalyst composition comprising an amide of at least one metal selected from the group consisting of caesium and rubidium, said amide being present in an amount between 0.05% and 10%, by weight, of the liquid ammonia.

References Cited in the file of this patent

UNITED STATES PATENTS

| 2,780,526 | Fleck | Feb. 5, 1957 |
| 2,787,526 | Spevack | Apr. 2, 1958 |